(12) United States Patent
Hayashi et al.

(10) Patent No.: US 8,161,920 B2
(45) Date of Patent: Apr. 24, 2012

(54) HEAT STORAGE APPARATUS AND ENGINE INCLUDING THE SAME

(75) Inventors: Kunihiko Hayashi, Odawara (JP); Hideo Kobayashi, Mishima (JP); Katuhiko Arisawa, Gotenba (JP); Yoshio Yamashita, Toyota (JP); Kenichi Yamada, Yaizu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 504 days.

(21) Appl. No.: 12/223,858

(22) PCT Filed: Jun. 4, 2007

(86) PCT No.: PCT/IB2007/001454
§ 371 (c)(1),
(2), (4) Date: Aug. 12, 2008

(87) PCT Pub. No.: WO2007/141619
PCT Pub. Date: Dec. 12, 2007

(65) Prior Publication Data
US 2010/0162972 A1   Jul. 1, 2010

(30) Foreign Application Priority Data
Jun. 5, 2006   (JP) ................................. 2006-156067

(51) Int. Cl.
*F01P 11/02* (2006.01)
(52) U.S. Cl. .................................. 123/41.14; 123/41.01
(58) Field of Classification Search ............... 123/41.14, 123/142.5 R, 198
See application file for complete search history.

(56) References Cited

U.S. PATENT DOCUMENTS

| | | | | |
|---|---|---|---|---|
| 3,517,151 A * | 6/1970 | Mekjean | ........................ | 219/618 |
| 3,596,034 A * | 7/1971 | Mekjean | ........................ | 219/628 |
| 5,378,337 A * | 1/1995 | Kiyomura | .................. | 204/230.3 |
| 5,379,337 A * | 1/1995 | Castillo et al. | .................. | 379/45 |
| 5,477,676 A * | 12/1995 | Benson et al. | .................. | 60/274 |
| 5,477,696 A * | 12/1995 | Takahata et al. | ................ | 62/148 |
| 5,564,402 A * | 10/1996 | Poschl | .......................... | 123/590 |
| 5,954,119 A * | 9/1999 | Yamamura et al. | ............. | 165/10 |
| 6,520,136 B2 * | 2/2003 | Ito et al. | .................. | 123/142.5 R |
| 2005/0167079 A1 * | 8/2005 | Zhang | ............................. | 165/10 |
| 2008/0087255 A1 * | 4/2008 | Aoyama et al. | ............. | 123/48 B |
| 2008/0135006 A1 * | 6/2008 | Shikida | .................. | 123/142.5 R |
| 2010/0162972 A1 * | 7/2010 | Hayashi et al. | ............ | 123/41.14 |

FOREIGN PATENT DOCUMENTS

| | | |
|---|---|---|
| JP | 61-185676 A | 8/1986 |
| JP | 01-181091 A | 7/1989 |
| JP | 11-182393 A | 7/1999 |
| JP | 11182393 A * | 7/1999 |
| JP | 2004-177079 A | 6/2004 |
| JP | 2005-220809 A | 8/2005 |

(Continued)

*Primary Examiner* — Noah Kamen
*Assistant Examiner* — Long T Tran
(74) *Attorney, Agent, or Firm* — Kenyon & Kenyon LLP (57) ABSTRACT

In the cylinder block of an engine including a heat storage apparatus, a water jacket is formed between a cylinder bore wall that forms a cylinder bore and a cylinder block outer wall. An actuator is installed on the cylinder block outer wall. A container is housed in the water jacket. A coolant temperature sensor is installed on the upper portion of the container. An ECU determines the state of a heat storage agent in the container and the state of the container, based on information on the temperature of coolant determined by the coolant temperature sensor.

14 Claims, 10 Drawing Sheets

FOREIGN PATENT DOCUMENTS

| | | | |
|---|---|---|---|
| JP | 2006-082342 | * | 8/2005 |
| KR | 2002031642 | * | 5/2002 |
| KR | 369156 B | * | 1/2003 |
| WO | WO 2007/023794 A | | 3/2007 |

* cited by examiner

HEAT STORAGE APPARATUS AND ENGINE INCLUDING THE SAME

This is a 371 national phase application of PCT/IB2007/001454 filed 4 Jun. 2007, claiming priority to Japanese Patent Application No. 2006-156067 filed 5 Jun. 2006, the contents of which are incorporated herein by reference.

BACKGROUND OF THE INVENTION

1. Field of the Invention

The invention relates to a heat storage apparatus that effectively warms up an engine.

2. Description of the Related Art

When warming-up has not been completed, for example, great friction is caused in an engine. Therefore, the warming-up needs to be quickly completed. In particular, components having slide portions, such as cylinder bores, pistons, and a crankshaft, need to be quickly warmed to efficiently operate the engine. In an ordinary engine, when air-fuel mixture starts to be ignited in the cylinder, engine components such as a cylinder block and a cylinder head, and engine oil that is circulated in oil passages formed in the engine components are warmed. Thus, the warming-up gradually proceeds. For example, Japanese Patent Application Publication No. 11-182393 (JP-A-11-182393) describes a quick warming-up apparatus for an engine, in which a latent heat storage material (heat storage agent) is housed in a heat storage material chamber that is formed to surround cylinders to quickly complete warming-up of the engine. In the quick warming-up apparatus, voltage is applied to the heat storage agent in the supercooled state during the cold start of the engine. Thus, the phase of the heat storage agent starts to be changed, and latent heat is released.

In such a quick warming-up apparatus for an engine, the temperature of the heat storage agent is detected by a temperature sensor; the detected value of the temperature of the heat storage agent is referenced; and the state of the heat storage agent is determined based on the record of the temperature of the heat storage agent after the heat storage agent releases heat, to avoid unnecessary application of the voltage and unnecessary release of heat. More specifically, the amount of heat received by the heat storage agent is estimated, based on, for example, the sum of time periods during which the temperature of the heat storage agent is equal to or above the melting point, or the sum of products of values of the temperature of the heat storage agent that are equal to or above the melting point and time periods during which the temperature of the heat storage agent is equal to or above the melting point when the engine is operating. Based on the amount of heat received by the heat storage agent, it is determined whether heat is stored in the heat storage agent, as latent heat. Based on such a determination, a control is executed to prevent the application of the voltage when the heat storage agent has not been returned to a heat storage state, that is, when heat is not stored in the heat storage agent. The temperature sensor, which detects the temperature of the heat storage agent, is installed in the heat storage material chamber.

Japanese Patent Application Publication No. 1-181091 (JP-A-1-181091) also describes a similar technology in which the state of a heat storage agent is determined. The heat storage apparatus described in this publication includes a latent heat storage material (heat storage agent); a heat storage tank containing the heat storage agent; temperature detection means for detecting the temperature of the heat storage agent; vapor pressure detection means for detecting the pressure of vapor in the heat storage tank; and control means for determining whether the heat storage agent is in the supercooled state, by comparing the pressure of saturated vapor determined based on the temperature of the heat storage agent detected by the temperature detection means, and the pressure detected by the vapor pressure detection means.

In the quick warming-up apparatus for an engine described in the publication No. 11-182393, it is possible to avoid, for example, unnecessary application of the voltage by determining the state of the heat storage agent. In the heat storage apparatus described in the publication No. 1-181091, it is possible to accurately determine whether the heat storage agent is in the supercooled state, by comparing the pressure of saturated vapor determined based on the temperature of the heat storage agent, and the pressure detected by the vapor pressure detection means.

However, in each of the quick warming-up apparatus for an engine described in the publication No. 11-182393 and the heat storage apparatus described in the publication No. 1-181091, the temperature sensor for detecting the temperature of the heat storage agent needs to be separately provided. Therefore, it costs much to newly prepare the temperature sensor, and to install the temperature sensor. Also, it is necessary to take measures to prevent a leak of the heat storage agent in the portion where the temperature sensor is installed. This also increases the cost.

SUMMARY OF THE INVENTION

The invention provides a heat storage apparatus in which at least one of the state of a heat storage agent housed in a container housed in a water jacket formed in a cylinder block and the state of the container is determined without the need of providing a temperature sensor used exclusively for determining the temperature of the heat storage agent. The invention also provides an engine including the heat storage apparatus.

A first aspect of the invention relates to a heat storage apparatus that includes a container housed in a water jacket formed in a cylinder block; a heat storage agent contained in the container; a primary nucleation trigger that causes the primary nucleation of the heat storage agent; an operation portion that operates the primary nucleation trigger; a coolant temperature sensor that measures the temperature of coolant that flows in the water jacket; and a calculation portion that indirectly determines at least one of the state of the heat storage agent and the state of the container, based on the temperature of the coolant detected by the coolant temperature sensor. As the coolant temperature sensor, a coolant temperature sensor generally provided in an engine may be used. Therefore, it is not necessary to provide a temperature sensor used exclusively for measuring the temperature of the heat storage agent, or a special sensor or the like used for determining the state of the heat storage agent.

The heat storage apparatus in the above-described aspect may further include an estimated wall-temperature determination portion that determines the estimated value of the temperature of the wall of the cylinder block. The estimated wall-temperature determination portion may calculate the estimated value of the temperature of the wall, based on at least the value of a fuel injection amount, the calorific value of fuel, the value of the mass of an engine, and the temperature of the coolant. In this case, the estimated wall-temperature determination portion may calculate the estimated value of the temperature of the wall, further based on an adaptation coefficient, and a cooling loss coefficient. The value of the fuel injection amount may be determined by an ECU (electronic control unit) that is generally provided in the engine. Also, the calorific value of fuel and the value of the mass of the engine may be determined in advance in each engine. Further, the temperature of the coolant may be determined by the coolant temperature sensor that is generally provided in the engine, as described above. That is, the estimated value of the temperature of the wall is determined using the values determined by the sensor and the like that are generally provided in the engine, without the need of providing a special configuration for determining the estimated value of the temperature of the wall.

In the above-described aspect, the calculation portion may determine at least one of the state of the heat storage agent and the state of the container, based on the difference between the temperature of the coolant and the estimated value of the temperature of the wall when the temperature of the coolant and the estimated value of the temperature of the wall increase. During the cold start of the engine, the temperature of the coolant and the estimated value of the temperature of the wall, which are determined in the above-described manner, increase along the substantially same trajectory. However, the temperature of the coolant, which is actually measured, stops increasing when the phase of the heat storage agent is changed from the solid phase to the liquid phase. At this time, the temperature of the coolant differs from the estimated value of the temperature of the wall. Based on the difference between the temperature of the coolant and the estimated value of the temperature of the wall, at least one of the state of the heat storage agent and the state of the container is determined. That is, when the difference between the temperature of the coolant and the estimated value of the temperature of the wall is equal to or above a predetermined value, it is determined that the phase of the heat storage agent has been changed from the solid phase to the liquid phase. As a result, it is determined that a predetermined amount of heat storage agent is retained in the container, and therefore, no damage or the like occurs in the container.

Also, in the above-described aspect, the calculation portion may determine at least one of the state of the heat storage agent and the state of the container, based on the rate at which the temperature of the coolant decreases when the temperature of the coolant decreases. If the heat storage agent, which has been brought to the liquid phase state due to absorption of heat, is brought to the solid phase state when the temperature of the coolant decreases due to the stop of the engine, the temperature of the coolant stops decreasing. If the phase of the heat storage agent is changed to the solid phase, that is, if the heat storage agent is not brought to the supercooled state, there is no possibility that the primary nucleation is caused, that is, heat is released due to the phase change from the liquid phase to the solid phase when the primary nucleation trigger is operated next time. Accordingly, when there is a change in the rate at which the temperature of the coolant decreases, and the temperature of the coolant stops decreasing, it is determined that the heat storage agent is not in the supercooled state. In this case, the primary nucleation trigger is not operated. This avoids unnecessary use of power.

In the above-described aspect, the calculation portion may determine at least one of the state of the heat storage agent and the state of the container, based on the temperature of the coolant after the primary nucleation trigger is operated. When an instruction for operating the primary nucleation trigger is output during the cold start of the engine, and the primary nucleation trigger is normally operated, and accordingly the primary nucleation is caused, the temperature of the coolant increases due to the released latent heat. Thus, when there is such an increase in the temperature of the coolant, it is determined that the primary nucleation of the heat storage agent is normally caused, and no damage or the like occurs in the container, that is, the container does not malfunction.

In the above-described aspect, the operation portion may include a pressing pin, and the primary nucleation trigger may be operated when the primary nucleation trigger is pressed by the pressing pin.

As described above, according to the invention, it is determined whether the phase of the heat storage agent has been changed from the solid phase to the liquid phase; it is determined whether the state of the heat storage agent has not been changed from the liquid phase state to the supercooled state (that is, it is determined whether a suppercooling failure occurs); it is determined whether the primary nucleation of the heat storage agent, which has been in the supercooled state, is caused; and it is determined whether the container malfunctions. Based on the determinations, the operation of the primary nucleation trigger is stopped, or a Malfunction Indicator Lamp (MIL) is turned on to notify a user that a malfunction occurs.

A commonly-used engine may include the heat storage apparatus in any one of the above-described aspects.

In the invention, any heat storage agent may be employed, as long as the heat storage agent in the supercooled state stores latent heat, and when a predetermined condition for causing the primary nucleation is satisfied, the phase of the heat storage agent is changed to release the latent heat, i.e., to generate heat. For example, sodium acetate trihydrate may be employed.

In the invention, the heat storage agent is housed in the water jacket, and a coolant passage is disposed in the water jacket. This is because at least one of the state of the heat storage agent and the state of the container is determined based on the temperature of the coolant in the invention. By moving the coolant temperature sensor to a position near the container, it is possible to more accurately determine changes in the temperature of the coolant, which are caused by changes of the heat storage agent.

According to the invention, the state of the heat storage agent is determined using the temperature of the coolant determined by the existing coolant temperature sensor, and the values determined using the existing components of the engine. Therefore, it is not necessary to provide a temperature sensor used exclusively for measuring the temperature of the heat storage agent, or a special sensor or the like used for determining the state of the heat storage agent. This suppresses an increase in the cost of the apparatus. Also, it is possible to avoid the situation where the heat storage agent leaks due to installation of such a sensor in the container.

BRIEF DESCRIPTION OF THE DRAWINGS

The foregoing and/or further objects, features and advantages of the invention will become more apparent from the following description of example embodiment with reference to the accompanying drawings, in which like numerals are used to represent like elements and wherein.

DETAILED DESCRIPTION OF THE EXAMPLE EMBODIMENTS

In the following description, the present invention will be described in more detail in terms of example embodiments.

Figure 1:
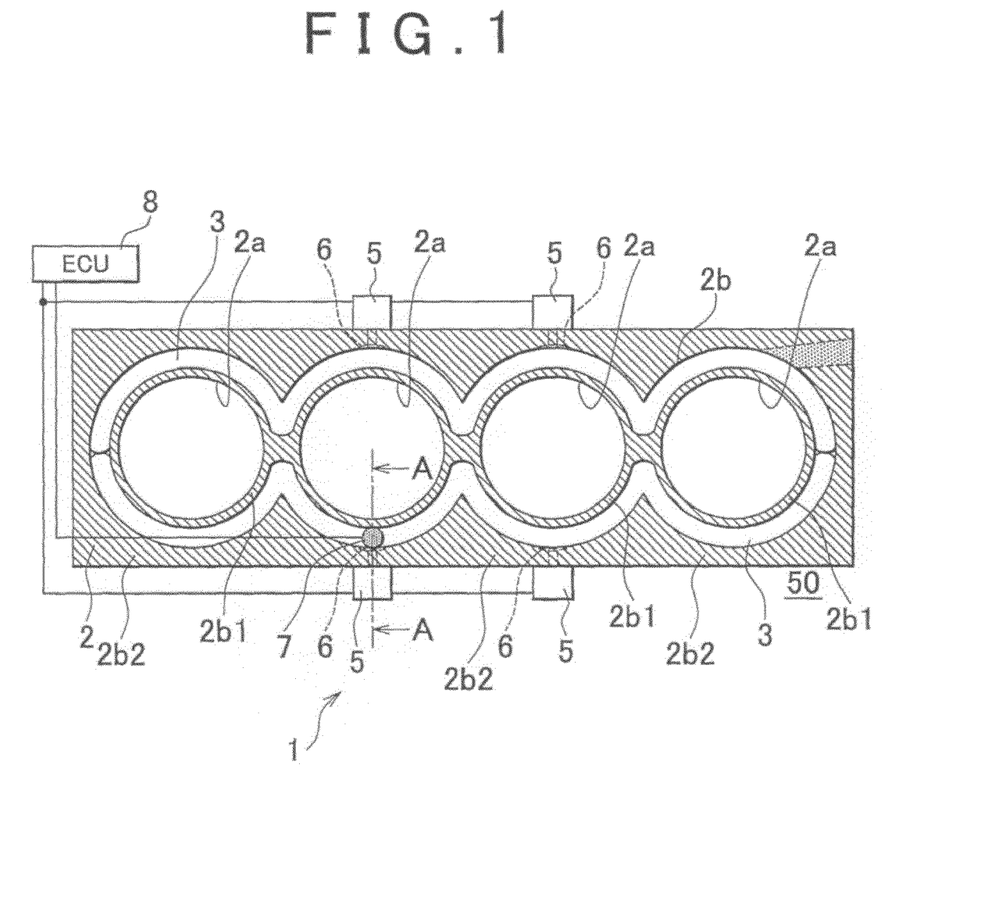
FIG. 1 is a cross sectional view of the cylinder block of an engine including a heat storage apparatus, which is viewed from an upper surface-side.
Figure 2:
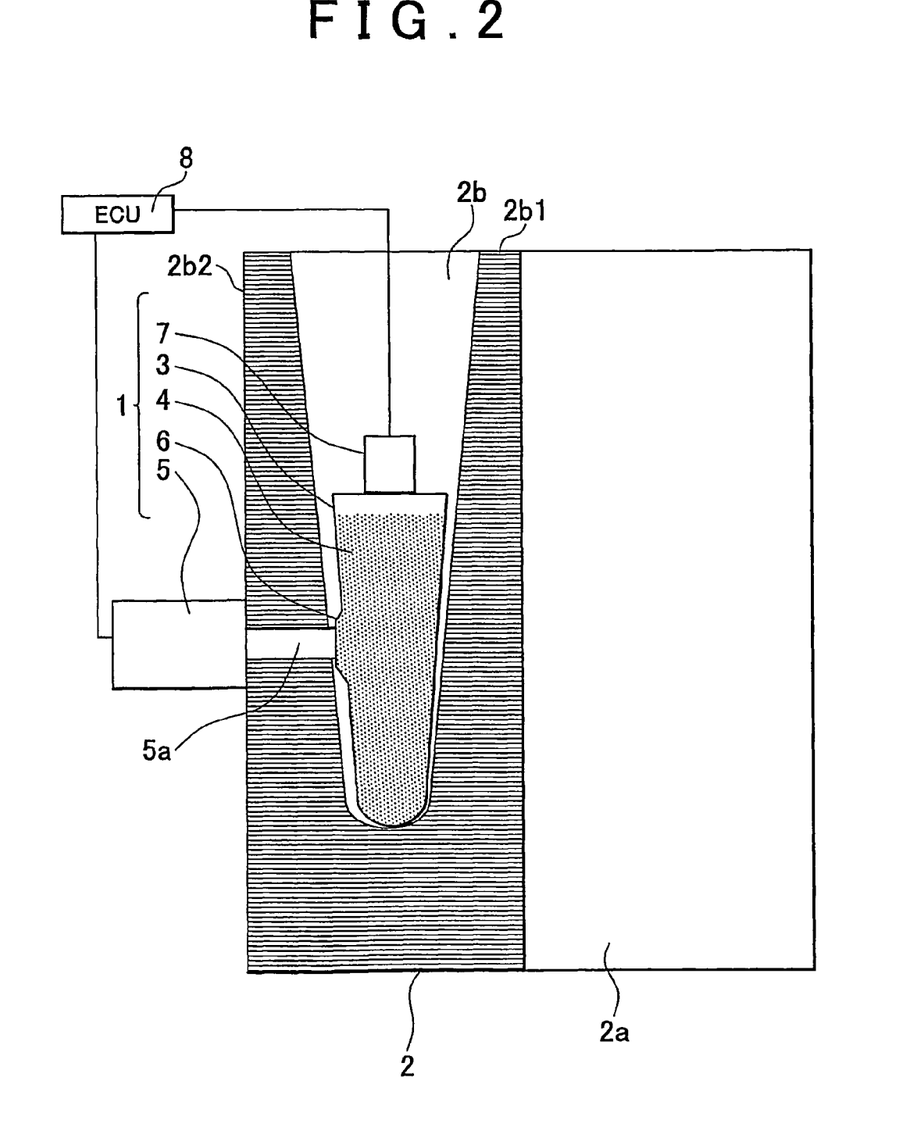
FIG. 2 is a cross sectional view taken along the line A-A in FIG. 1.

FIG. 1 is a cross sectional view of the cylinder block 2 of a four-cylinder engine 50 including a heat storage apparatus 1, which is viewed from an upper surface-side. FIG. 2 is a cross sectional view taken along the line A-A in FIG. 1. In the cylinder block 2, a water jacket 2b is formed between a cylinder bore wall 2b1 that forms a cylinder bore 2a, and a cylinder block outer wall 2b2. Actuators 5 are installed on the cylinder block outer wall 2b2. Two containers 3, which face each other, are housed in the water jacket 2b. A heat storage agent 4 is contained in the containers 3. As the heat storage agent 4, sodium acetate trihydrate is employed.

Figure 3:
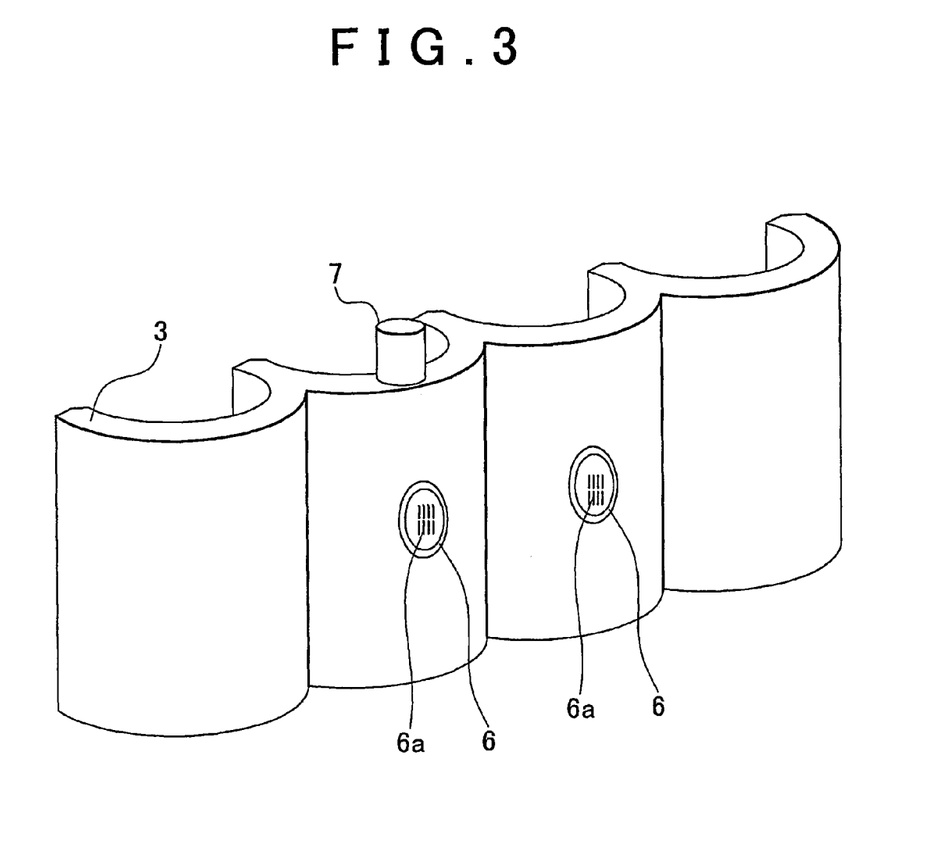
FIG. 3 is an enlarged perspective view of a container.

FIG. 3 is an enlarged perspective view of the container 3. Each container 3 has a shape of a half of one container. More specifically, the two containers 3 are obtained by dividing one container, which surrounds the cylinder bore wall 2b1, into two parts. Thus, the two containers 3 are disposed on the sides of the cylinder bore wall 2b1, and the cylinder bore wall 2b1 is sandwiched between the two containers 3.

The containers 3 are provided with primary nucleation triggers 6. Each primary nucleation trigger 6 is provided with a slit 6a. When each primary nucleation trigger 6 is pressed by the pressing pin 5a of the actuator 5, the primary nucleation of the heat storage agent 4 is caused in the containers 3. When the primary nucleation is caused, the phase of the heat storage agent 4 is changed. Thus, the heat storage agent 4 releases latent heat. The actuator 5 may be regarded as the operation portion that operates the primary nucleation trigger 6 according to the invention.

A coolant temperature sensor 7 is installed on the upper portion of the container 3. The coolant temperature sensor 7 detects the temperature of coolant that flows in the water jacket 2b.

The actuators 5 and the coolant temperature sensor 7 are connected to an ECU (Electronic control unit) 8. The ECU 8 constitutes the calculation portion, and a part of the estimated wall-temperature determination portion. The ECU 8 obtains information on the temperature of the coolant from the coolant temperature sensor 7. Also, the ECU 8 determines a fuel injection amount value (Q) that is the value of the fuel injection amount. Further, the ECU 8 stores an engine mass value (M) that is the value of the mass of the engine, a fuel calorific value (c1) that is the calorific value of fuel, an engine specific heat (c2) that is the specific heat of the engine, an adaptation coefficient (c3), and a cooling loss coefficient (⅓ is employed in the embodiment). Using these values, the ECU 8 calculates an estimated wall temperature value ($TH_{wall}$) that is the estimated value of the wall temperature. The estimated wall temperature value ($TH_{wall}$) is calculated using the following equation (1).

$$TH_{wall} = (\tfrac{1}{2} \times Q \times c1)/(M \times c2) \times c3 + TH_{wsta} \quad (1)$$

In this equation 1, $TH_{wsta}$ represents the value of the coolant temperature in the initial stage during the process of starting the engine. The estimated wall temperature value $TH_{wall}$ is a parameter used to estimate the temperature of the heat storage agent 4. That is, the temperature of the wall of the cylinder block is calculated, and the temperature of the heat storage agent 4 is estimated based on the calculated temperature of the wall of the cylinder block. Thus, it is possible to estimate the temperature of the heat storage agent, without the need of providing a sensor other than the coolant temperature sensor 7. Other means for estimating the temperature of the heat storage agent without the need of providing a sensor other than the coolant temperature sensor 7 may be employed.

Next, calculation processes executed by the ECU 8, and the operation of the heat storage apparatus 1 will be described. The ECU 8 executes a primary-nucleation failure determination process for the heat storage agent 4, that is, the ECU 8 determines whether a primary nucleation failure occurs, according to the flowchart shown in FIG. 4. Also, the ECU 8 executes a malfunction determination process and a heat-storage-agent fusion determination process for the containers 3, that is, the ECU 8 determines whether the containers 3 malfunction, and determines whether the heat storage agent has been fused, according to the flowchart shown in FIG. 5. Further, the ECU 8 executes a supercooling failure determination process, that is, the ECU 8 determines whether a supercooling failure occurs, according to the flowchart shown in FIG. 7. These determination processes are executed independently of each other, and in parallel with each other.

First, the primary-nucleation failure determination process for the heat storage agent 4 will be described with reference to the flowchart shown in FIG. 4. In step S1, the ECU 8 determines whether the engine 50 has been started. That is, the ECU 8 determines whether the engine 50 is operating. When an affirmative determination is made in step S1, the ECU 8 executes step S2. In step S2, the ECU 8 determines whether an instruction for operating the actuator 5 has been output. The ECU 8 outputs the instruction for operating the actuator 5 according to the other program. The ECU 8 determines whether the instruction for operating the actuator 5 has been output in the process shown in FIG. 4. When a negative determination is made in step S2, the process returns to step S1.

When an affirmative determination is made in step S2, the ECU 8 executes step S3. In step S3, the ECU 8 obtains a coolant temperature value $TH_w$ from the coolant temperature sensor 7, as the information on the temperature of the coolant. A series of steps (step S1 to step S11) in the flowchart shown in FIG. 4 is repeatedly executed after the engine 50 is started. The ECU 8 stores the temperature of the coolant obtained when step S3 is executed for the first time after the engine 50 is started, as the coolant temperature initial value $TH_{wsta}$.

After the coolant temperature initial value $TH_{wsta}$ is stored in step S3, the ECU 8 determines whether the coolant temperature initial value $TH_{wsta}$ is equal to or below 40° C. in step S4. When the coolant temperature initial value $TH_{wsta}$ is above 40° C., there is no difference between the temperature of the heat storage agent and the temperature of the coolant, and accordingly, it is difficult to accurately execute the primary-nucleation failure determination process, that is, it is difficult to accurately determine whether a primary nucleation failure occurs. Therefore, when the coolant temperature initial value $TH_{wsta}$ is above 40° C., the primary-nucleation failure determination process is not executed.

When an affirmative determination is made in step S4, the ECU 8 executes step S5. In step S5, the ECU 8 stores the highest coolant temperature value $TH_{wmax}$. The highest coolant temperature value $TH_{wmax}$ is updated as needed. In step S5, the ECU 8 calculates the estimated wall temperature value $TH_{wall}$ using the above-described equation (1).

Figure 6:
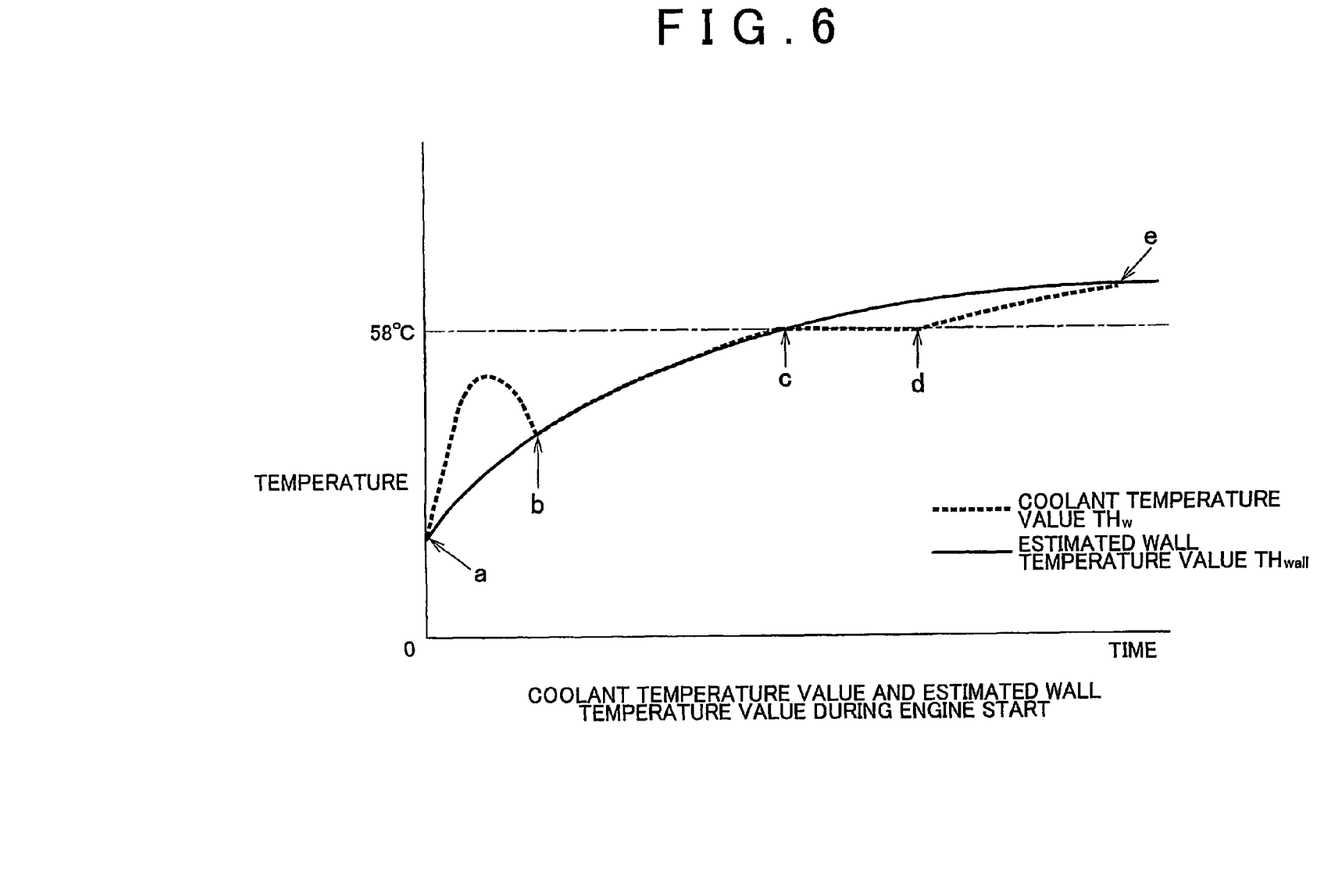
FIG. 6 is a graph showing time-dependent changes in a coolant temperature value $TH_w$ and an estimated wall temperature value $TH_{wall}$ when the coolant temperature value $TH_w$ and the estimated wall temperature value $TH_{wall}$ increase during the cold start of the engine.

In step S6 subsequent to step S5, the ECU 8 calculates the difference between the highest coolant temperature value $TH_{wmax}$ and the estimated wall temperature value $TH_{wall}$, and the ECU 8 determines whether the difference is equal to or above 5° C. FIG. 6 is a graph showing time-dependent changes in a coolant temperature value $TH_w$ and the estimated wall temperature value $TH_{wall}$ when the coolant temperature value $TH_w$ and the estimated wall temperature value $TH_{wall}$ increase during the cold start of the engine 50. In FIG. 6, the dashed line indicates the coolant temperature value $TH_w$, and the solid line indicates the estimated wall temperature value $TH_{wall}$. In FIG. 6, the coolant temperature value $TH_w$ increases due to the primary nucleation of the heat storage agent 4 in the interval between "a" and "b". That is, if the primary nucleation is appropriately caused, the highest coolant temperature value $TH_{wmax}$ differs from the estimated wall temperature value $TH_{wall}$ in the interval between "a" and "b" as shown in FIG. 6. In the embodiment, the value of the difference, which is used to determine whether the primary nucleation is appropriately caused, is set to 5° C. When the difference between the highest coolant temperature value $TH_{wmax}$ and the estimated wall temperature value $TH_{wall}$ is equal to or above 5° C., it is determined that the primary nucleation trigger 6 normally functions, and the primary nucleation is appropriately caused.

When an affirmative determination is made in step S6, the ECU 8 executes step S7. In step S7, the ECU 8 turns a primary-nucleation confirmation flag ON. The primary-nucleation confirmation flag is turned OFF each time the engine 50 is stopped. That is, the initial state of the primary-nucleation confirmation flag is the OFF state. After the ECU 8 executes step 7, the ECU 8 executes step 8. When a negative determination is made in step S6, the ECU 8 skips step S7, and executes step S8.

In step S8, the ECU 8 determines whether the latest highest coolant temperature value $TH_{wmax}$ is equal to or above 50° C. The step S8 is executed to determine whether the difference determined in step S6 is caused by the primary nucleation of the heat storage agent 4. That is, if the difference between the highest coolant temperature value $TH_{wmax}$ and the estimated wall temperature value $TH_{wall}$ is determined to be equal to or above 5° C. in step S6 under the situation where the highest coolant temperature value $TH_{wmax}$ is below 50° C., it is considered that the difference is not caused by the primary nucleation of the heat storage agent 4, and the difference is caused for any other reason. Taking this into account, step S8 is executed. The value of 50° C. is employed taking into account that the melting point of the heat storage agent 4 is approximately 58° C.

After the ECU 8 executes step S8, the ECU 8 executes step S9. In step S9, the ECU 8 determines whether the primary-nucleation confirmation flag is ON. That is, in step S9, the ECU 8 determines whether the primary-nucleation confirmation flag is turned ON in step S7, or step S7 is skipped and therefore the primary-nucleation confirmation flag remains OFF. When it is determined that the primary-nucleation confirmation flag is ON in step S9 (i.e., when an affirmative determination is made in step S9), the ECU 8 executes step S10. In step S10, the ECU 8 turns a flag relating to the primary-nucleation failure determination OFF. When it is determined that the primary-nucleation confirmation flag is OFF in step S9 (i.e., when a negative determination is made in step S9), the ECU 8 executes step S11. In step S11, the ECU 8 turns the flag relating to the primary-nucleation failure determination ON.

Thus, the ECU 8 executes the primary-nucleation failure determination process, that is, the ECU 8 determines whether a primary nucleation failure occurs, by executing the above-described steps.

Figure 5:
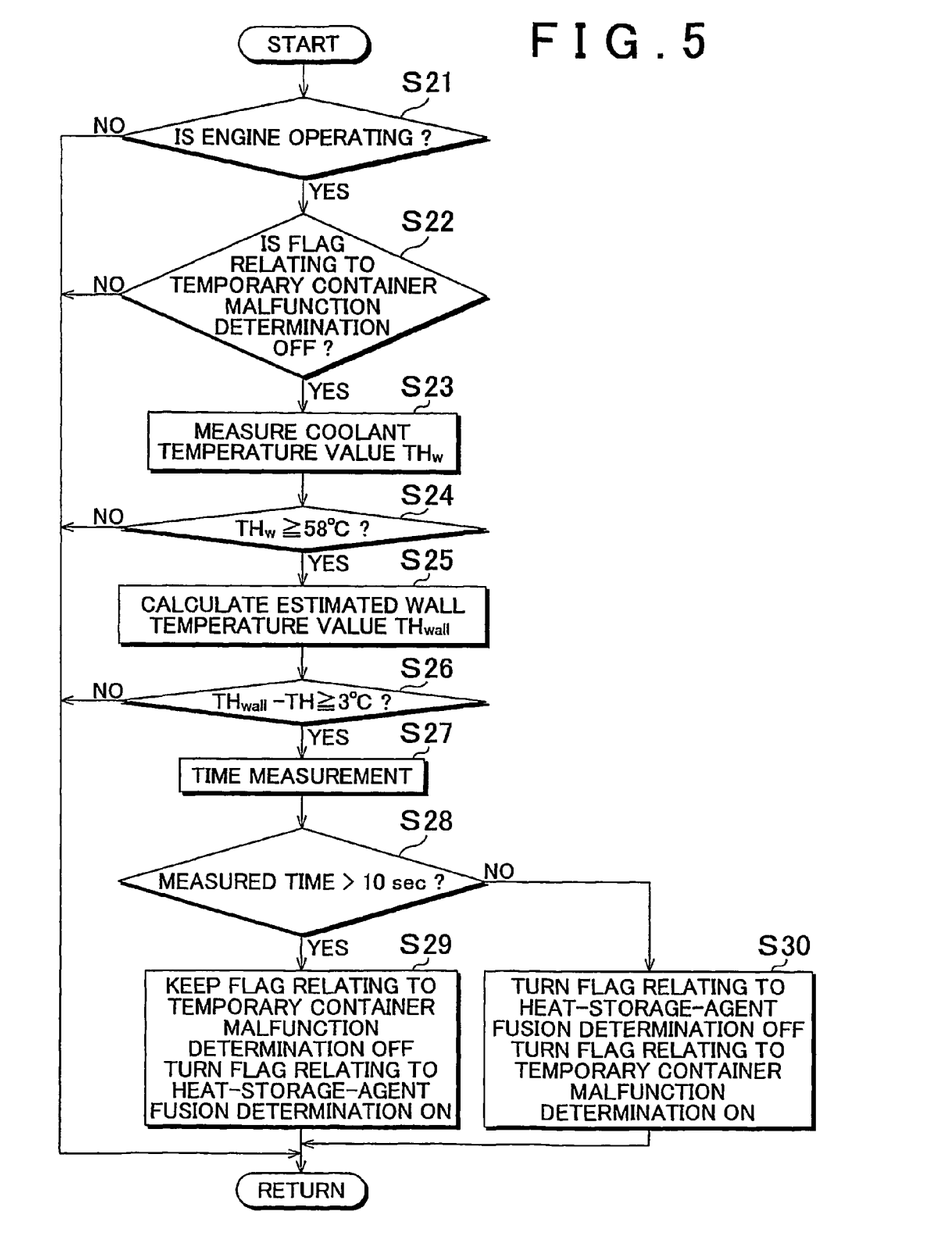
FIG. 5 is a flowchart showing steps of a malfunction determination process and a heat-storage-agent fusion determination process for a container.

Next, the malfunction determination process and the heat-storage-agent fusion determination process for the containers 3 will be described with reference to the flowchart shown in FIG. 5. In step S21, the ECU 8 determines whether the engine 50 has been started. That is, the ECU 8 determines whether the engine 50 is operating. When an affirmative determination is made in step S21, the ECU 8 executes step S22. In step S22, the ECU 8 determines whether a flag relating to a temporary container malfunction determination is OFF. Step S22 is executed to determine whether it was determined that the containers 3 malfunctioned when the determination process was previously executed. When an affirmative determination is made in step S22, the ECU 8 executes step S23. In step S23, the ECU 8 obtains the coolant temperature value $TH_w$ from the coolant temperature sensor 7. Subsequently, the ECU 8 executes step S24. In step S24, the ECU 8 determines whether the obtained coolant temperature value $TH_w$ is equal to or above 58° C. Note that the melting point of the heat storage agent 4 is approximately 58° C.

When an affirmative determination is made in step S24, the ECU 8 executes step S25. In step S25, the ECU 8 calculates the estimated wall temperature value $TH_{wall}$ using the above-described equation (1).

After the ECU 8 executes step S25, the ECU 8 executes step S26. In step S26, the ECU 8 determines whether the difference between the estimated wall temperature value $TH_{wall}$ and the coolant temperature value $TH_w$ is equal to or above 3° C. More specifically, the ECU 8 determines whether the estimated wall temperature value $TH_{wall}$ is higher than the coolant temperature value $TH_w$ by at least 3° C. In FIG. 6, after the interval between "a" and "b", the heat storage agent 4 is in the solid phase state until the temperature of the heat storage agent 4 reaches the melting point, i.e., 58° C., that is, until the point "c" is reached in FIG. 6. After the heat storage agent 4 in the supercooled state, i.e., in the liquid phase releases latent heat, the heat storage agent 4 is brought to the solid phase state. When the heat storage agent 4 receives heat from the engine 50 that is being warmed up, and the temperature of the heat storage agent 4 reaches the melting point, i.e., 58° C., the phase of the heat storage agent 4 is changed to the liquid phase again. Because the endothermic reaction occurs at this time, the temperature of the heat storage agent 4 stops increasing, and accordingly, the coolant temperature value $TH_w$ also stops increasing. Thus, the trajectory, which indicates the time-dependent changes in the coolant temperature value $TH_w$, horizontally extends in the interval between "c" and "d" as shown in FIG. 6, and then, extends to reach the point "e". As a result, the estimated wall temperature value $TH_{wall}$, which increases along the curve to reach the point "e", differs from the coolant temperature value $TH_w$. Thus, in step S26, the ECU 8 determines whether the estimated wall temperature value $TH_{wall}$ differs from the coolant temperature value $TH_w$ by at least 3° C.

When an affirmative determination is made in step S26, the ECU 8 starts time measurement to determine whether the estimated wall temperature value $TH_{wall}$ remains higher than the coolant temperature value $TH_w$ by at least 3° C. (step S27). In step S28, the ECU 8 determines whether 10 seconds have passed after the time measurement is started in step S27.

When an affirmative determination is made in step S28, the ECU 8 executes step S29. In step S29, the ECU 8 keeps a flag relating to the temporary container malfunction determination OFF, and turns a flag relating to the heat-storage-agent fusion determination ON. Thus, when the estimated wall temperature value $TH_{wall}$ differs from the coolant temperature value $TH_w$ by at least the predetermined value, it is determined that the phase of the heat storage agent 4 has been changed to the liquid phase, and no damage or the like occurs in the containers 3, that is, the containers 3 do not malfunction, and therefore the heat storage agent 4 is retained in the containers 3.

When a negative determination is made in step S28, the ECU 8 executes step S30. In step S30, the ECU 8 turns the flag relating to the temporary container malfunction determination ON, and turns the flag relating to the heat-storage-agent fusion determination OFF. Thus, when the estimated wall temperature value $TH_{wall}$ does not differ from the coolant temperature value $TH_w$ by at least the predetermined value, it is determined that the phase of the heat storage agent 4 has not been changed to the liquid phase, and there is a possibility that damage or the like occurs in the containers 3, that is, the containers 3 malfunction.

Figure 7:
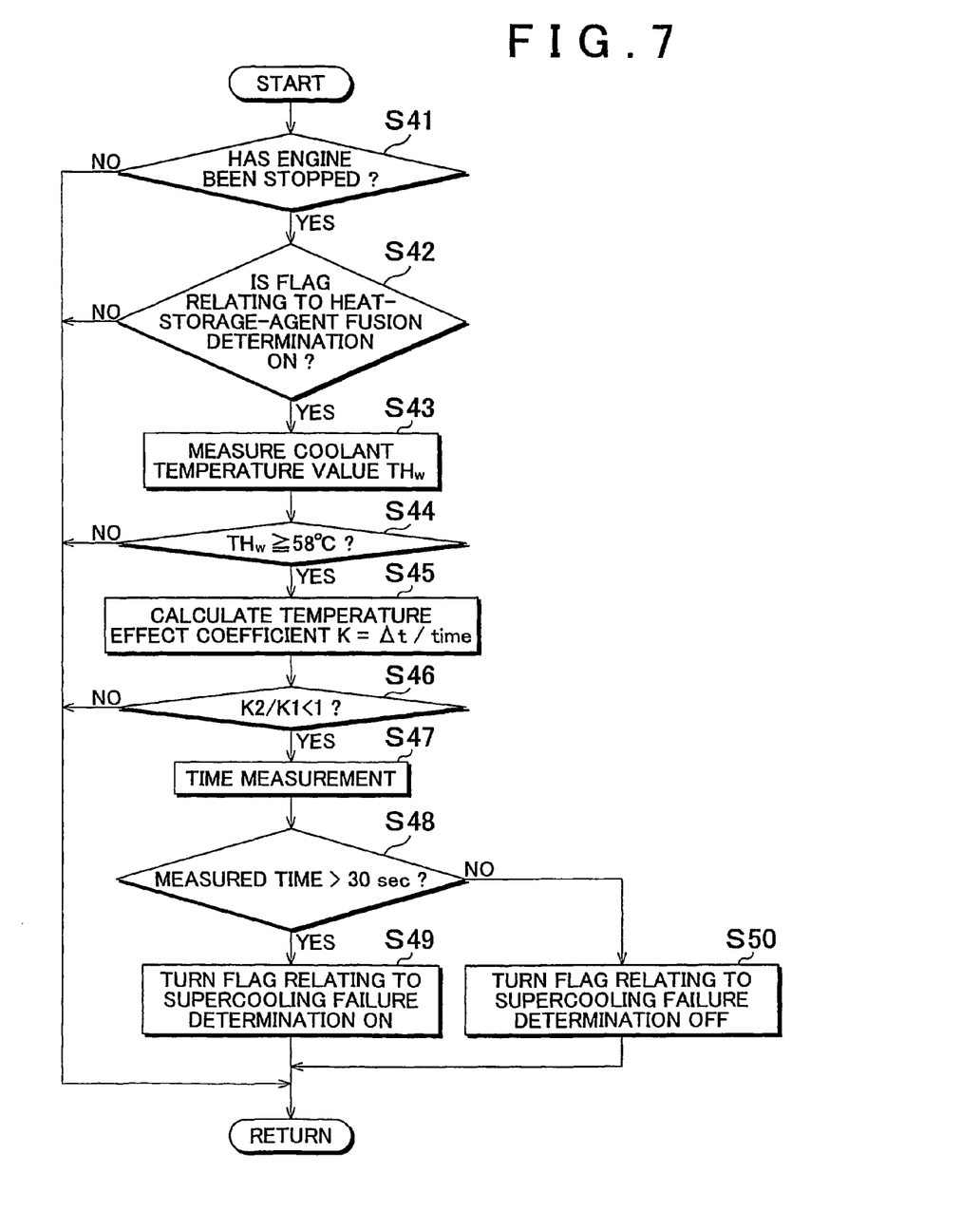
FIG. 7 is a flowchart showing steps of a supercooling failure determination process.

Next, the supercooling failure determination process will be described with reference to the flowchart shown in FIG. 7. In step S41, the ECU 8 determines whether the engine 50 has been stopped. That is, the ECU 8 determines whether the engine 50 is in the stopped state. When an affirmative determination is made in step S41, the ECU 8 executes step S42. In step S42, the ECU 8 determines whether the flag relating to the heat-storage-agent fusion determination is ON. When the ECU 8 makes this determination, the ECU 8 references the flag relating to the heat-storage-agent fusion determination set in step S29 in the flowchart shown in FIG. 5. The ECU 8 executes the supercooling failure determination process, that is, the ECU 8 determines whether a supercooling failure occurs, on the precondition that the heat storage agent 4 has been fused, i.e., the heat storage agent 4 is in the liquid phase state. Therefore, the ECU 8 executes step S42 to determine whether the heat storage agent 4 has been fused, i.e., the heat storage agent 4 is in the liquid phase state.

When an affirmative determination is made in step S42, the ECU 8 executes step S43. In step S43, the ECU 8 obtains the coolant temperature value $T_w$ from the coolant temperature sensor 7. Subsequently, the ECU 8 executes step S44. In step S44, the ECU 8 determines whether the obtained coolant temperature value $TH_w$ is equal to or above 58° C.

Figure 8:
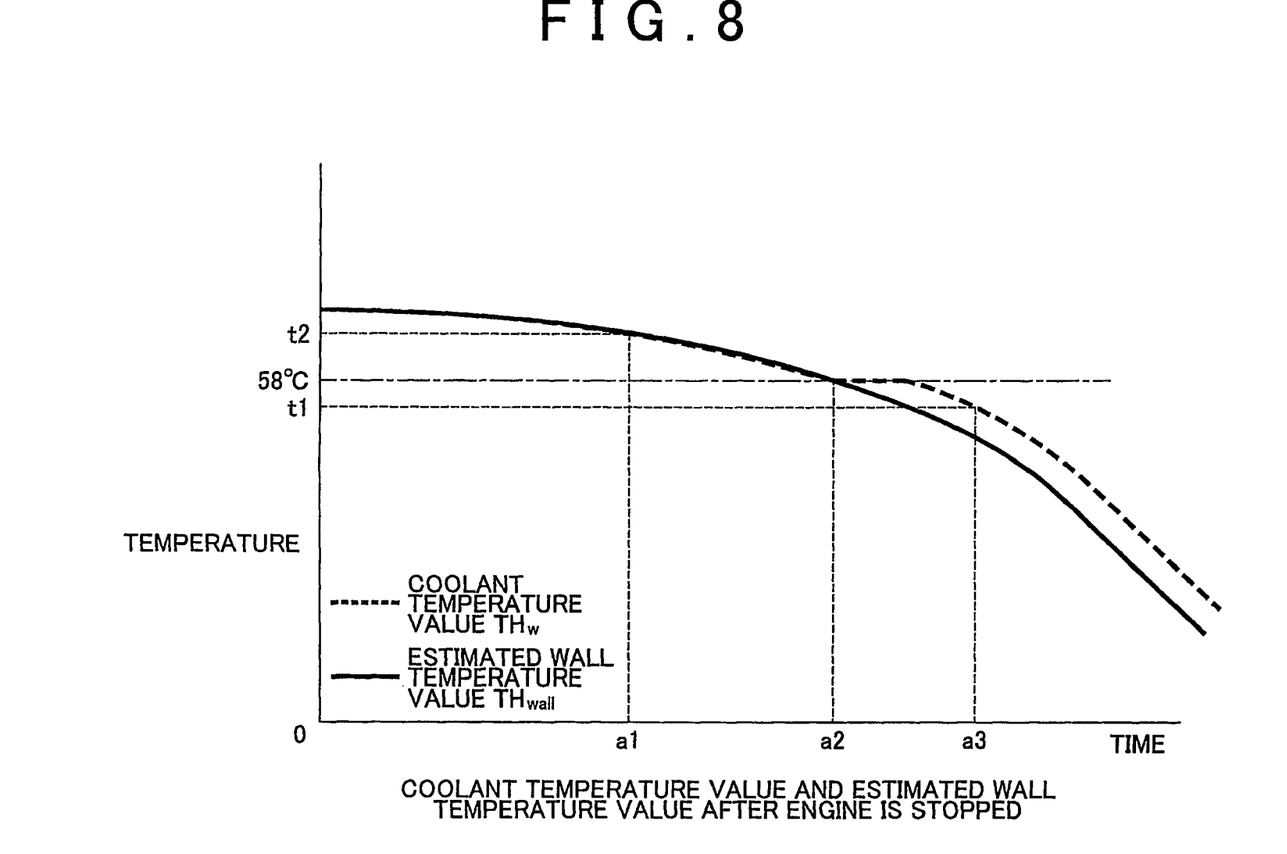
FIG. 8 is a graph showing time-dependent changes in the coolant temperature value $TH_w$ and the estimated wall temperature value $TH_{wall}$ when the coolant temperature value $TH_w$ and the estimated wall temperature value $TH_{wall}$ decrease after the engine is stopped.

When an affirmative determination is made in step S44, the ECU 8 executes step S45. In step S45, the ECU 8 calculates a temperature effect coefficient K. The temperature effect coefficient K indicates how the coolant temperature value $TH_w$, changes. The ECU 8 calculates the temperature effect coefficient K using the equation, $K=\Delta t/time$. In this equation, $\Delta t$ represents the change in the coolant temperature. FIG. 8 is a graph showing time-dependent changes in the coolant temperature value $TH_w$ and the estimated wall temperature value $TH_{wall}$ when the coolant temperature value $TH_w$ and the estimated wall temperature value $TH_{wall}$ decrease after the engine 50 is stopped. In FIG. 8, the dashed line indicates the coolant temperature value $TH_w$, and the solid line indicates the estimated wall temperature value $TH_{wall}$. In FIG. 8, the temperature $t_2$ is a temperature higher than the melting point of the heat storage agent 4, i.e., 58° C. The ECU 8 stores the time point a1 at which the coolant temperature value $TH_w$ reaches the temperature $t_2$. Also, the ECU 8 stores the time point a2 at which the coolant temperature value $TH_w$ reaches 58° C. First, the ECU 8 calculates the temperature effect coefficient K1, using the equation, $K1=(t_2-58° C.)/(a2-a1)$. That is, the ECU 8 calculates the rate at which the coolant temperature value $TH_w$ decreases before the coolant temperature value $TH_w$ reaches 58° C. Also, the ECU 8 calculates the rate at which the coolant temperature value $TH_w$ decreases after the coolant temperature value $TH_w$ reaches 58° C. in a similar manner. That is, the ECU 8 calculates the temperature effect coefficient K2, using the equation, $K2=(58° C.-t_1)/(a3-a2)$. In this equation, $t_1$ represents a temperature equal to or lower than 58° C., and a3 represents the time point at which the coolant temperature value $TH_w$ reaches the temperature $t_1$.

In step S46, the ECU 8 determines whether the relation of K2/K1<1 is satisfied after the values of K1 and K2 are calculated in step S45. That is, the ECU 8 determines whether the rate at which the coolant temperature value $TH_w$ decreases is low after the coolant temperature value $TH_w$ reaches the melting point of the heat storage agent 4, i.e., 58° C., as compared to the rate at which the coolant temperature value $TH_w$ decreases before the coolant temperature value $TH_w$ reaches 58° C. When the phase of the heat storage agent 4 is changed from the liquid phase to the solid phase, the heat storage agent 4 releases latent heat, and therefore, the trajectory indicating the time-dependent changes in the coolant temperature value $TH_w$ horizontally extends from the time point at which the coolant temperature value $TH_w$ reaches the 58° C., as shown in FIG. 8. As a result, the rate at which the coolant temperature value $TH_w$ decreases is low after the coolant temperature value $TH_w$ reaches 58° C., as compared to the rate at which the coolant temperature value $TH_w$ decreases before the coolant temperature value $TH_w$ reaches 58° C. Thus, the ECU 8 determines whether the phase of the heat storage agent 4 has been changed to the solid phase, that is, whether a supercooling failure occurs, based on the reduction in the rate at which the coolant temperature value $TH_w$ decreases. In FIG. 8, for convenience of explanation, the interval between the temperature $t_2$ and the temperature $t_1$ is large. However, in reality, the coolant temperature value $TH_w$ is determined in an extremely short cycle, and the values of K2 and K1 are updated as needed. The equation used in step S46 is not limited to "K2/K1<1", as long as the equation makes it possible to determine whether there is a reduction in the rate at which the coolant temperature value $TH_w$ decreases.

In step S47, the ECU 8 starts time measurement to determine how many seconds the relation of K2/K1<1, which is determined to be satisfied in steps S46, remains satisfied. In step S48, the ECU 8 determines whether 30 seconds have passed after the time measurement is started.

When an affirmative determination is made in step S48, the ECU 8 executes step S49. In step S49, the ECU 8 turns a flag relating to the supercooling failure determination ON. That is, the ECU 8 determines that the heat storage agent 4 has not been brought to the supercooled state, and the heat storage agent 4 has been brought to the solid phase state. Thus, the ECU 8 turns the flag ON to indicate that the heat storage agent 4 has not been brought to the supercooled state, and the heat storage agent 4 has been brought to the solid phase state. When a negative determination is made in step S48, the ECU 8 executes step S50. In step S50, the ECU 8 turns the flag relating to the supercooling failure determination OFF. That is, the ECU 8 determines that the heat storage agent 4 has been brought to the supercooled state, and therefore, the primary nucleation of the heat storage agent 4 may be caused when the primary nucleation trigger 6 is operated next time. Thus, the ECU 8 turns the flag OFF to indicate that the heat storage agent 4 has been brought to the supercooled state.

Figure 9:
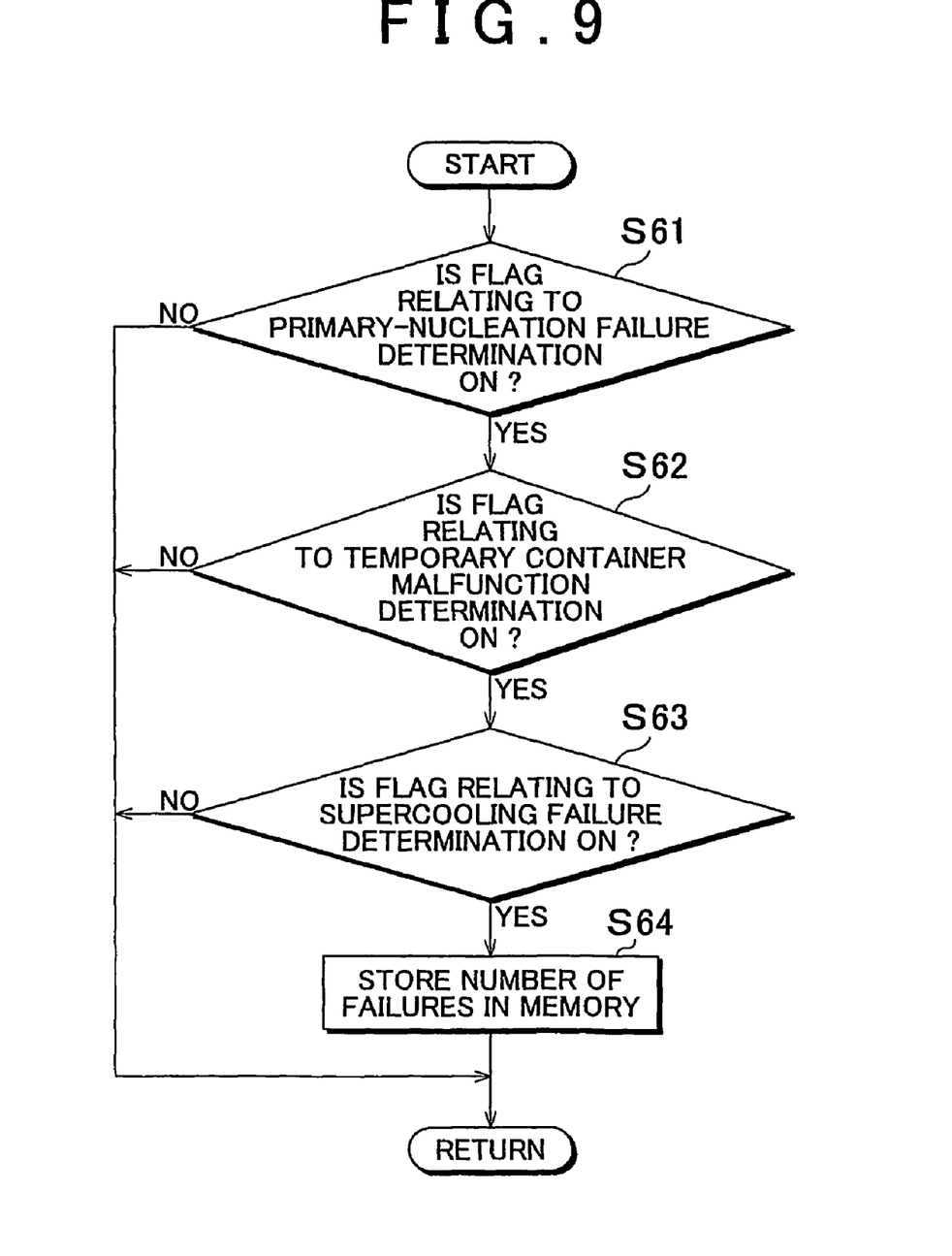
FIG. 9 is a flowchart showing steps of a failure determination process for the heat storage apparatus.
Figure 10:
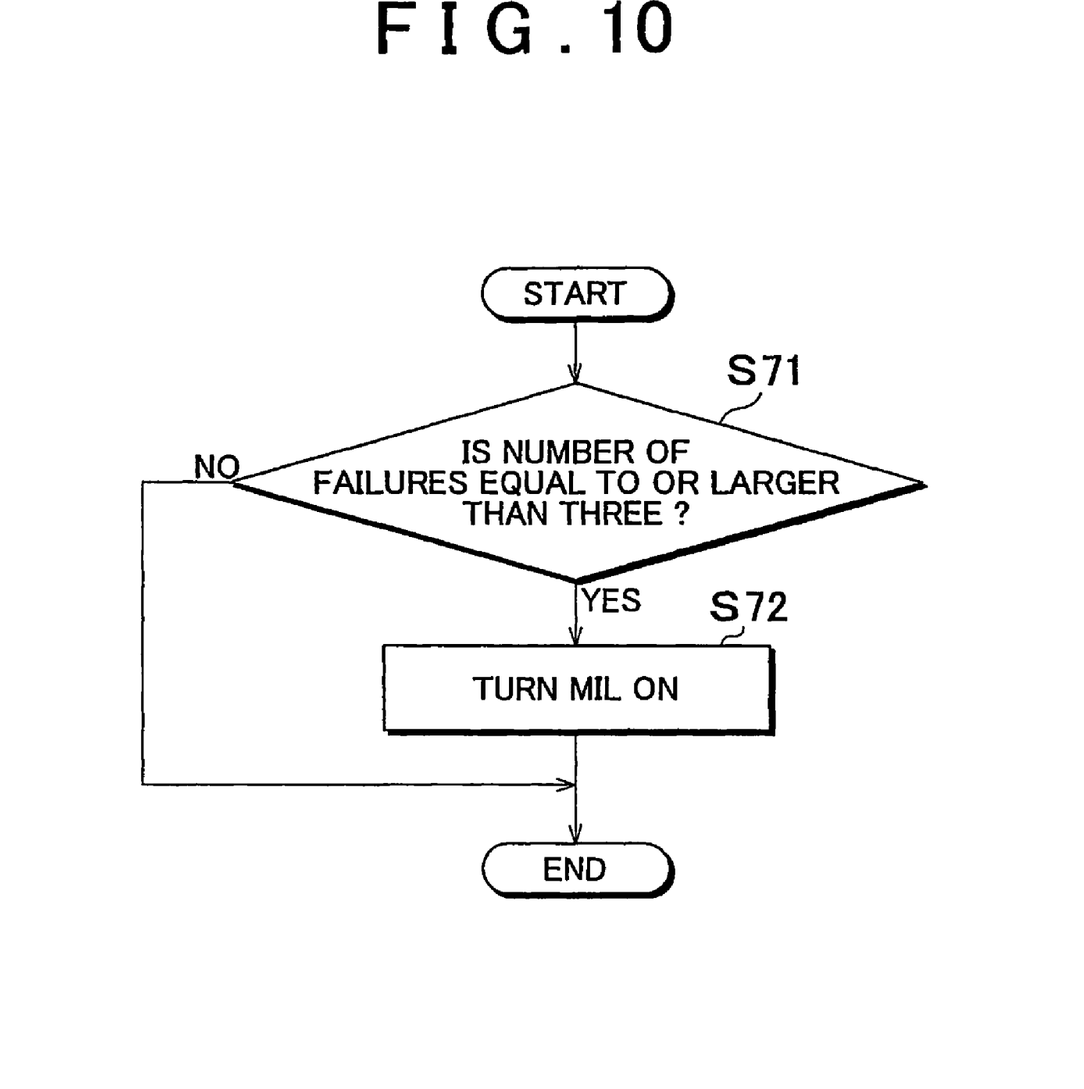
FIG. 10 is a flowchart showing a process for a Malfunction_Indicator_Lamp (MIL).

The ECU 8 executes processes using the results of the above-described three determination processes, according to the flowcharts shown in FIG. 9 and FIG. 10. Hereinafter, the processes executed by the ECU 8 using the results of the above-described three determination processes will be described.

Figure 4:
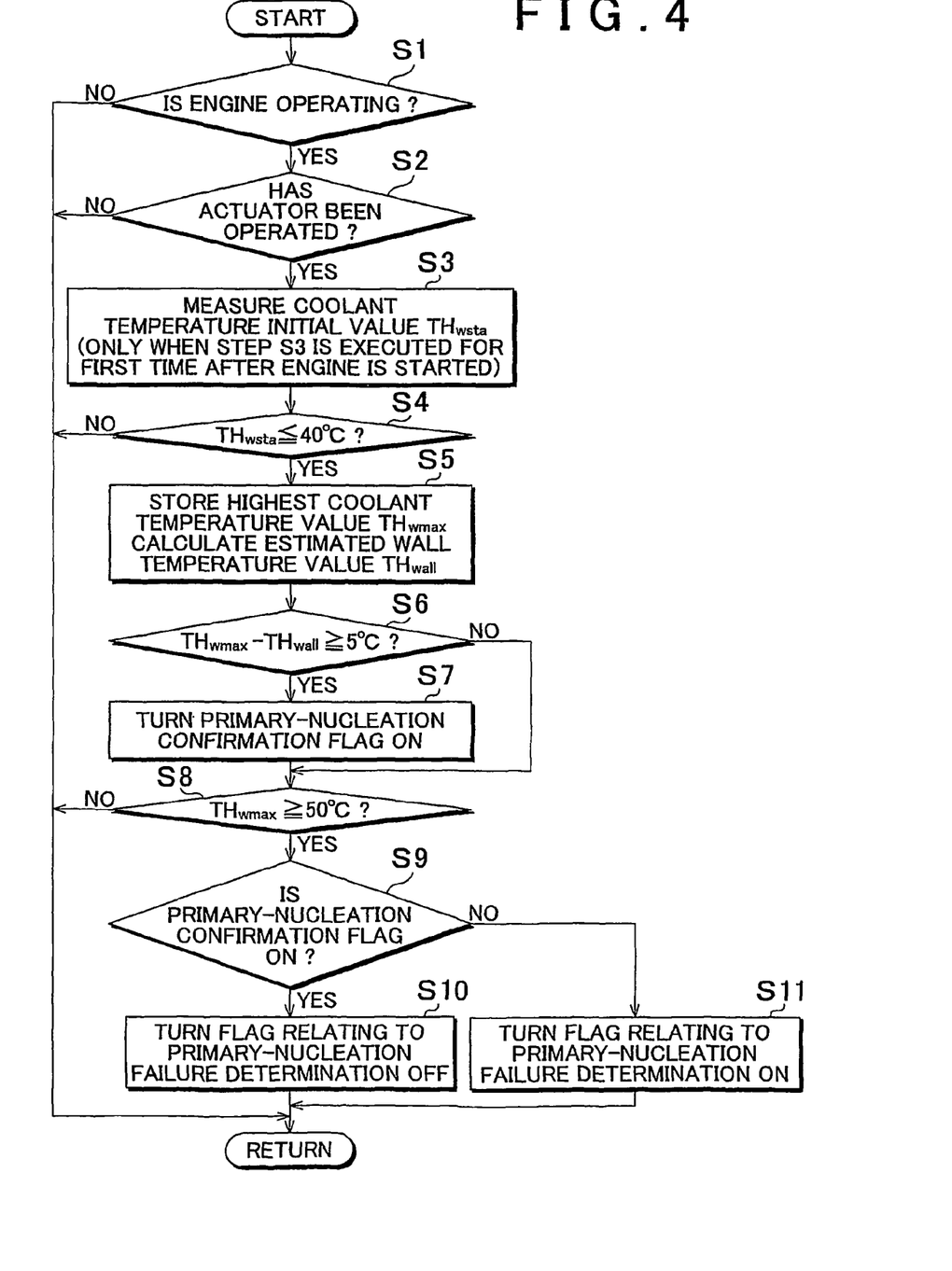
FIG. 4 is a flowchart showing steps of a primary-nucleation failure determination process for a heat storage agent.

First, in step S61 in the flowchart shown in FIG. 9, the ECU 8 determines whether the flag relating to the primary-nucleation failure is ON, based on the result of the determination process executed according to the flowchart shown in FIG. 4. In step S62, the ECU 8 determines whether the flag relating to the temporary container malfunction determination is ON, based on the result of the determination process executed according to the flowchart shown in FIG. 5. In step S63, the ECU 8 determines whether the flag relating to the supercooling failure determination is ON, based on the result of the determination process executed according to the flowchart shown in FIG. 7. In step S64, the ECU 8 stores, in the memory, the number of times that affirmative determinations are made in all of steps S61 to S63, as the number of failures.

Further, the ECU 8 executes the process according to the flowchart shown in FIG. 10. That is, in step S71, the ECU 8 determines whether the number of failures stored in step S64 in FIG. 9 is equal to or larger than three. When an affirmative determination is made in step S71, the ECU 8 turns a Malfunction Indicator Lamp (MIL) ON to notify a user that a malfunction occurs (step S72). The ECU 8 determines that a malfunction occurs when the number of failures reaches three, taking into account that the flags may be turned ON under some conditions even when no malfunction occurs in the heat storage apparatus 1.

While the invention has been described with reference to example embodiments thereof, it is to be understood that the invention is not limited to the example embodiments or constructions. To the contrary, the invention is intended to cover various modifications and equivalent arrangements. Further, it is evident from the above description that the invention may be realized in other various embodiments in the scope of the invention. In the above-described embodiments, the values and the like are used for explanation. Thus, in an actual apparatus, values appropriate for systems of the actual apparatus may be selected.

The invention claimed is:

1. A heat storage apparatus comprising:
   a container housed in a water jacket formed in a cylinder block;
   a heat storage agent contained in the container;
   a primary nucleation trigger that causes a primary nucleation of the heat storage agent;
   an operation portion that operates the primary nucleation trigger;
   a coolant temperature sensor that measures a temperature of coolant that flows in the water jacket; and
   an electronic control unit including a calculation portion that indirectly determines at least one of a state of the heat storage agent and a state of the container, based on the temperature of the coolant detected by the coolant temperature sensor,
   wherein the calculation portion determines at least one of the state of the heat storage agent and the state of the container, based on a rate at which the temperature of the coolant decreases when the temperature of the coolant decreases.

2. The heat storage apparatus according to claim 1, further comprising:
   an estimated wall-temperature determination portion that determines an estimated value of a temperature of a wall of the cylinder block.

3. The heat storage apparatus according to claim 2, wherein the estimated wall-temperature determination portion calculates the estimated value of the temperature of the wall, based on at least a value of a fuel injection amount, a calorific value of fuel, a value of mass of an engine, and the temperature of the coolant.

4. The heat storage apparatus according to claim 3, wherein the estimated wall-temperature determination portion calculates the estimated value of the temperature of the wall, further based on an adaptation coefficient, and a cooling loss coefficient.

5. An engine comprising:
   the heat storage apparatus according to claim 4.

6. An engine comprising:
   the heat storage apparatus according to claim 3.

7. The heat storage apparatus according to claim 2, wherein the calculation portion determines at least one of the state of the heat storage agent and the state of the container, based on a difference between the temperature of the coolant and the estimated value of the temperature of the wall when the temperature of the coolant and the estimated value of the temperature of the wall increase.

8. An engine comprising:
   the heat storage apparatus according to claim 2.

9. An engine comprising:
   the heat storage apparatus according to claim 7.

10. The heat storage apparatus according to claim 1, wherein
    the calculation portion determines at least one of the state of the heat storage agent and the state of the container, based on the temperature of the coolant after the primary nucleation trigger is operated.

11. An engine comprising:
    the heat storage apparatus according to claim 10.

12. The heat storage apparatus according to claim 1, wherein
    the operation portion includes a pressing pin; and
    the primary nucleation trigger is operated when the primary nucleation trigger is pressed by the pressing pin.

13. An engine comprising:
    the heat storage apparatus according to claim 12.

14. An engine comprising:
    the heat storage apparatus according to claim 1.

* * * * *